US007017247B2

(12) United States Patent
Detzel

(10) Patent No.: US 7,017,247 B2
(45) Date of Patent: Mar. 28, 2006

(54) VALVE STEM REMOVER AND INSTALLER TOOL KIT

(76) Inventor: Dave Detzel, 751 Firestone Dr., Avon Lake, OH (US) 44012

( * ) Notice: Subject to any disclaimer, the term of this patent is extended or adjusted under 35 U.S.C. 154(b) by 634 days.

(21) Appl. No.: 10/147,583

(22) Filed: May 17, 2002

(65) Prior Publication Data

US 2002/0170157 A1 Nov. 21, 2002

Related U.S. Application Data

(60) Provisional application No. 60/292,071, filed on May 18, 2001.

(51) Int. Cl.
*B23P 19/04* (2006.01)

(52) U.S. Cl. .................................................... 29/221.5

(58) Field of Classification Search ................ 29/221.5, 29/222, 235, 213.1, 278, 280, 282, 283, 450, 29/451; 206/372, 373
See application file for complete search history.

(56) References Cited

U.S. PATENT DOCUMENTS

| | | | | |
|---|---|---|---|---|
| 3,750,258 A | | 8/1973 | Sampo | |
| 4,528,735 A | | 7/1985 | Eastridge et al. | |
| 4,765,048 A | | 8/1988 | Hokanson | |
| 4,795,180 A | * | 1/1989 | Polcyn | 206/373 |
| 4,807,343 A | | 2/1989 | Wadsworth | |
| 5,097,580 A | | 3/1992 | Story | |
| D399,107 S | | 10/1998 | Murray | |

* cited by examiner

*Primary Examiner*—Robert C. Watson
(74) *Attorney, Agent, or Firm*—Roetzel & Andress, LPA; George W. Moxon, II

(57) ABSTRACT

The present invention is a simple kit for removal and insertion of valve stems for tubeless tires while the tire remains mounted on the rim.

6 Claims, 5 Drawing Sheets

VALVE STEM REMOVER AND INSTALLER TOOL KIT

This application claims the benefit of provisional application Ser. No. 60/292,071, filed May 18, 2001.

BACKGROUND OF THE INVENTION

The present invention relates to a kit for the removal and insertion of valve stems on tubeless tire rims of tire wheels while the tire remains mounted on the rim.

Tubeless tires have a tire casing mounted on a wheel rim and a valve stem mounted in a hole in the rim. The stem has a threaded sleeve for attachment of a cap and a spring-biased valve insert for inflating the tire and retaining the air is mounted in the stem. Attached to the sleeve is a bulbous portion of an elastic material, and a groove is placed about the mid-portion of this elastic material to permit the bulbous portion to seat against the inside and outside faces of the rim. The stems are commonly inserted from the inside of the wheel by inserting the stem through the hole and pulling it until the groove in the bulbous portion seats about the hole. This installation requires that the tire be removed from the wheel.

A number of tools have been employed for inserting valve stems directly into the rim from the outside of the wheel. This avoids the common practice of removing the tire for replacement of a faulty valve stem. Some of these devices have been fairly simply, while a number of have used complex or cumbersome power assists to perform the installation. For example, U.S. Pat. No. 3,750,258, to Sampo, teaches a push rod slideably mounted in a body sleeve which has a tapered internal wall so that the rod can be pushed with a minimum of force to compress the bulbous end of the stem until it discharges into the hole of the rim. The insertion rod is disclosed as having a bulbous handle at one end to facilitate the insertion. U.S. Pat. No. 4,528,735, to Eastridge, et al., teaches a tire tool for installing a valve stem in an opening provided in the wheel, but the handle is pivotably attached for movement once the stem is engaged in the rim, to facilitate holding the valve stem for inflation of the tire. U.S. Pat. No. 4,765,048, to Hokanson, teaches a valve stem inserter which uses a combination of a tubular body having a tapered wall and a threaded shaft on the inserter which allows for the valve stem to be inserted using a screw for mechanical leverage. U.S. Pat. No. 4,807,343, to Wadsworth, teaches a tubeless tire valve stem inserter which has a handle activated installation mean which incrementally advances the installation rod in the same manner as a caulking gun. U.S. Pat. No. 5,097,580, to Story, teaches an apparatus for installing and removing valve stems in which the valve inserter is piston-driven, i.e., uses a piston and rod, to force the valve stem into place. Story also teaches a tool for accomplishing the removal of the valve stem. The tool includes a handle and elongated shaft mounted to and incorporated with the handle and bent at the lower end to form a hook or grasping means. U.S. Pat. No. Des. 399,107, to Murray, discloses a tire stem tool of a certain design.

SUMMARY OF THE INVENTION

The present invention is directed to a kit for removal and insertion of valve stems for tubeless tires into the rim of a wheel while the tire remains mounted on the rim. The present invention is a simple kit which does not require complicated mechanical devices for the removal or insertion of the valve stem, is easily stocked, and can be done with human power alone. Further, the removal tool has a J-shaped end which does not present a sharp or hooked end, which presents danger to humans employing the tool to remove valve stems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

Figure 1:
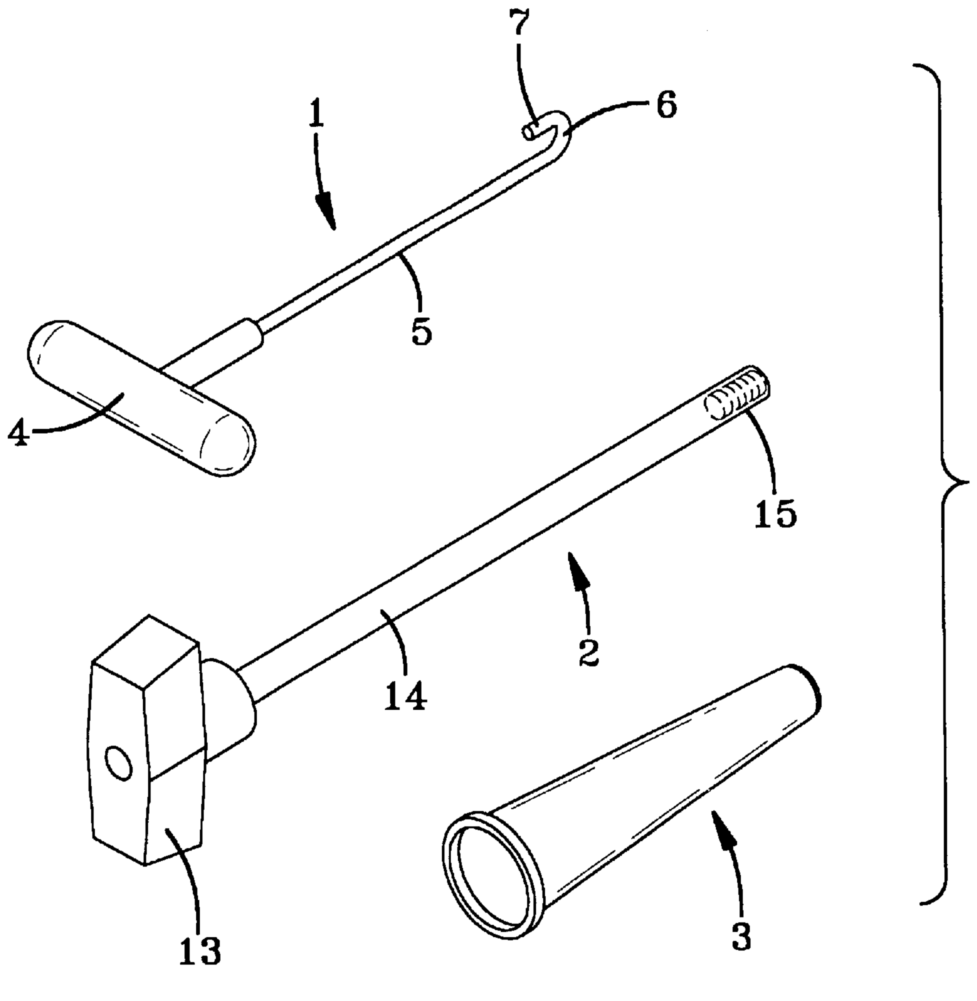
FIG. 1 shows an isometric view of the tire valve removal and installation kit.
Figure 2:
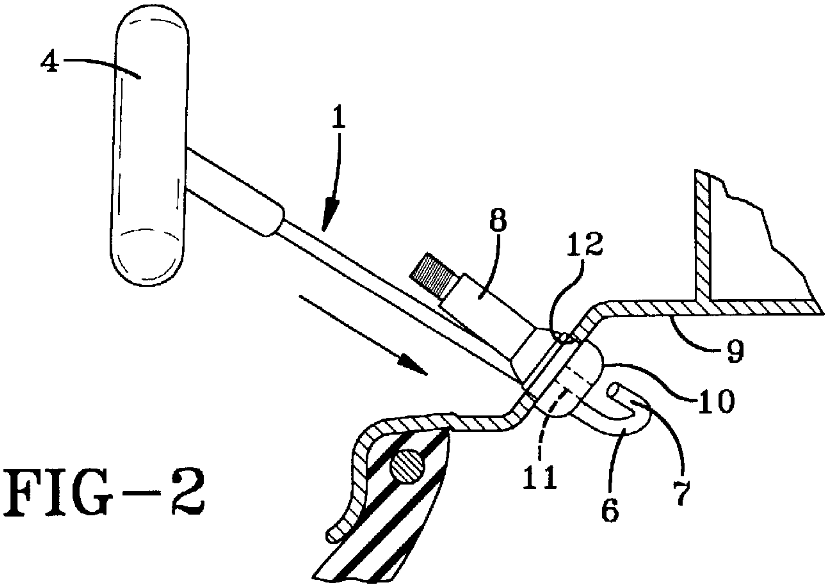
FIG. 2 shows the tool for removal of the tire valve inserted into the tire rim.

FIG. 1 illustrates the basic components of the kit, namely a valve stem removal tool 1, a valve stem insertion tool 2, and a valve stem insertion sleeve 3 which works in conjunction with the insertion tool 2.

Figure 3:
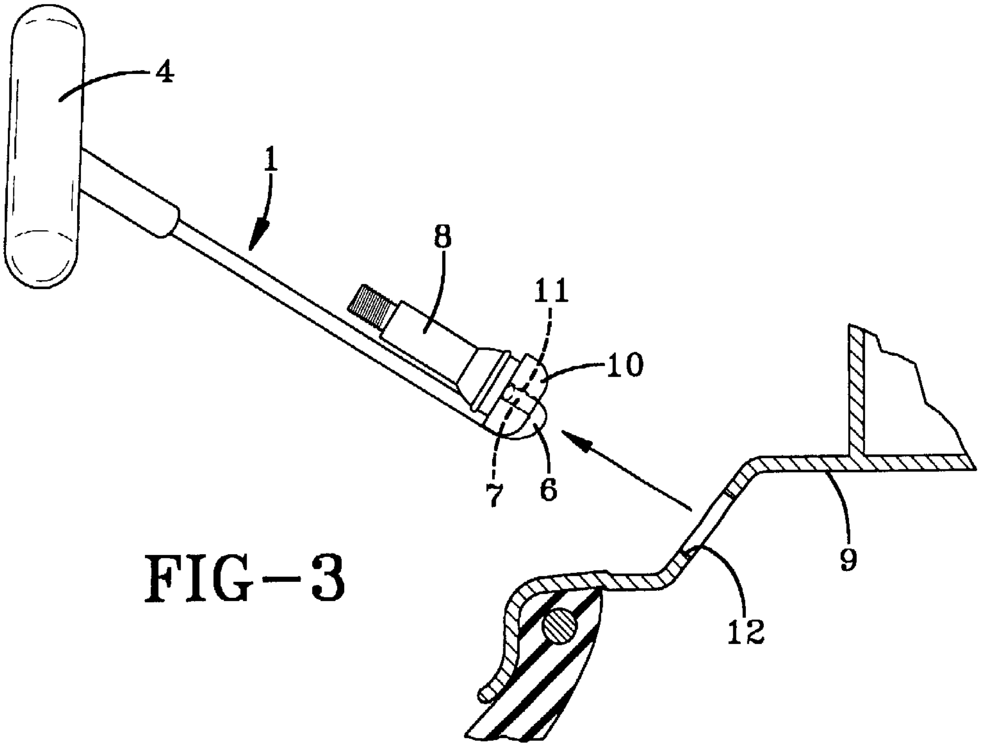
FIG. 3 shows the removal tool having removed the tire valve.

As shown in FIG. 1, the valve stem removal tool 1 has a handle 4 at one end connected to a rod 5 and a "J"-shaped engagement end 6 in which the short end of the "J" is of sufficient curvature and length to fit into the opening in the bulbous end of a valve stem which projects into the interior of the tubeless tire. Preferably, the short end of the "J" is blunt, i.e., not sharp or pointed, although some or a slight curvature, such as a dome shape, is acceptable. To remove a valve stem, the tool is inserted between the valve stem 8 and the opening in the wall of the tire 12. The "J" shape of the tool facilitates the insertion of the tool between the valve stem and the opening. As a practical matter, the size of the "J" is such that a tool which about 15.5 centimeters in length has a "J" section the short end of which is parallel to the rod section and at a distance of about 1 centimeter, while the short end is about 1 centimeter long. Once inserted, the tool is turned approximately one-quarter turn so that the short end of the "J" 7 will face and match-up with hole 11 in the bulbous end 10 of the valve stem. The "J" shape provides a secure grip on the valve stem and facilitates easy removal. It also shows that it does not need to be sharp to work. As shown in FIG. 3, as the valve stem removal tool is withdrawn, the valve stem is easily pulled out of opening 12.

Figure 4:
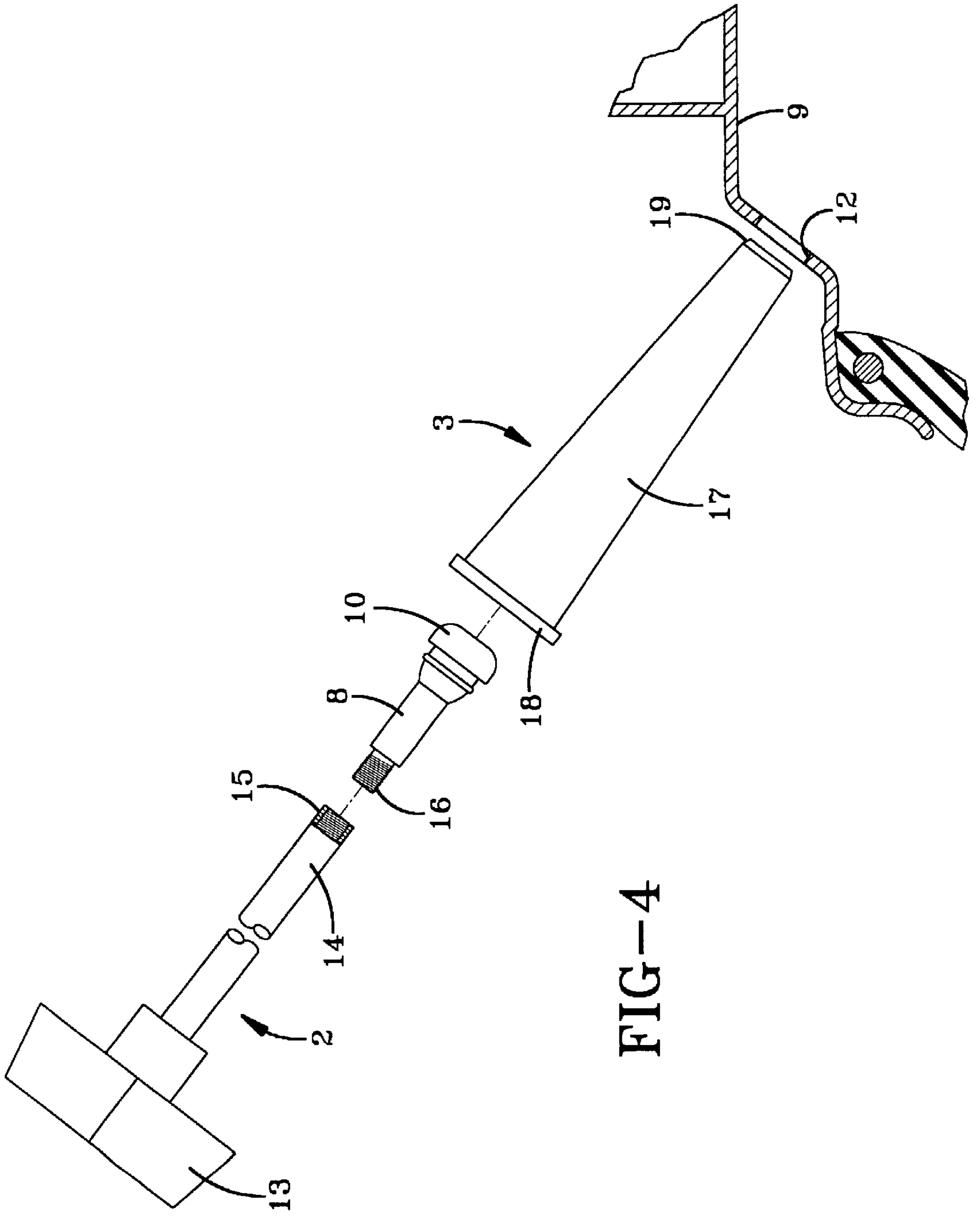
FIG. 4 shows the assembly of the valve inserter, a valve, and the insertion sleeve.

As shown in FIG. 4, the valve stem inserter 2 consists of a handle 13 connected to a shaft 14 having an internally threaded end 15 which can be readily threaded onto the threaded end 16 of a valve stem 8. To facilitate the insertion of the bulbous end 10 of the valve stem 8, the bulbous end 10 is coated or sprayed with an appropriate lubricant such as white grease, silicone or other appropriate lubricant to facilitate insertion and compression of the rubbery bulbous end. The valve stem insertion sleeve 3 is a truncated cone-shape in which the walls 17 are sloped and joined by an enlarged end 18 and a tapered end 19, which facilitate matching-up the sleeve 3 with the opening 12 in the tire rim. The exact slope is not critical, but, by way of example, the sleeve could be about 12 centimeters in length with a large opening of about 2 centimeters and a small opening of about 1.2 centimeters.

Figure 5A:
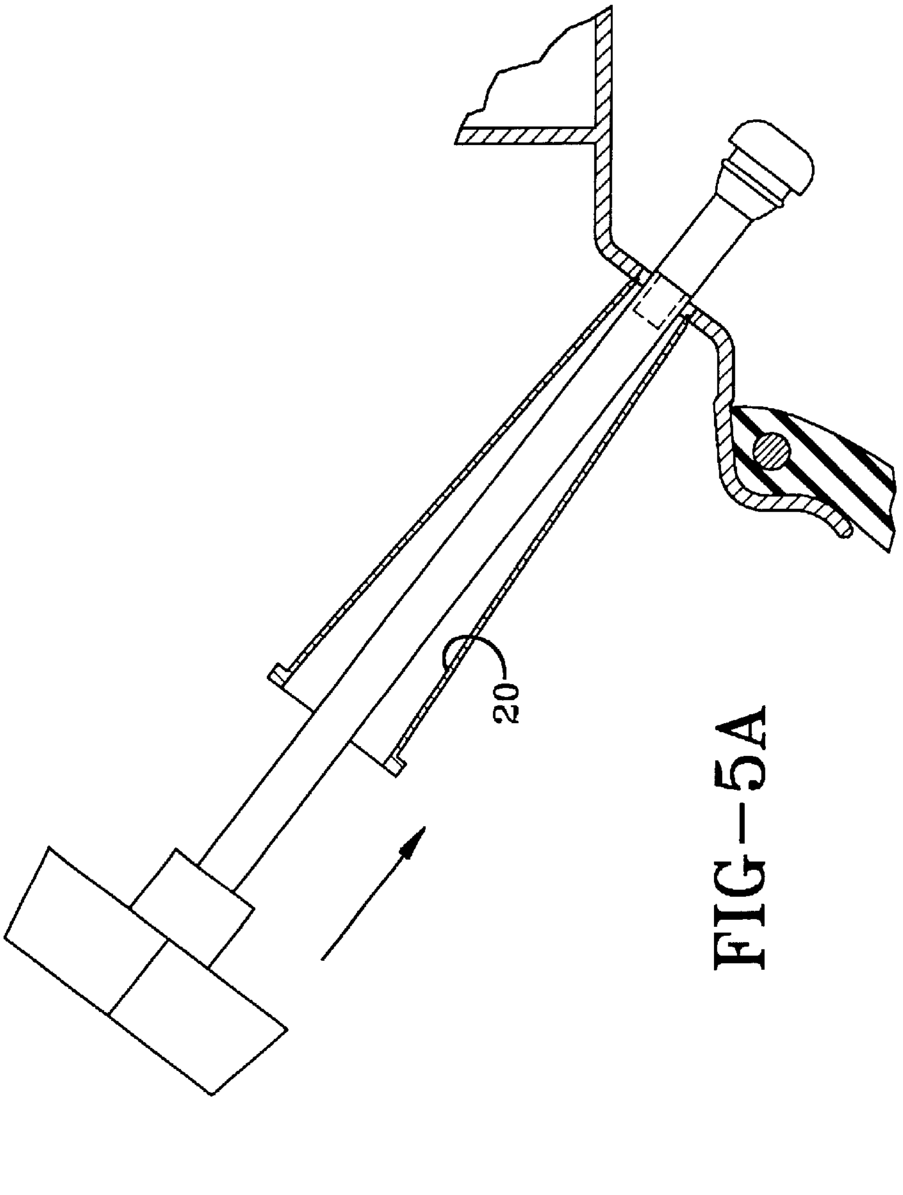
FIGS. 5A and 5B show the valve inserted into the rim and subsequently seated in the rim
Figure 5B:
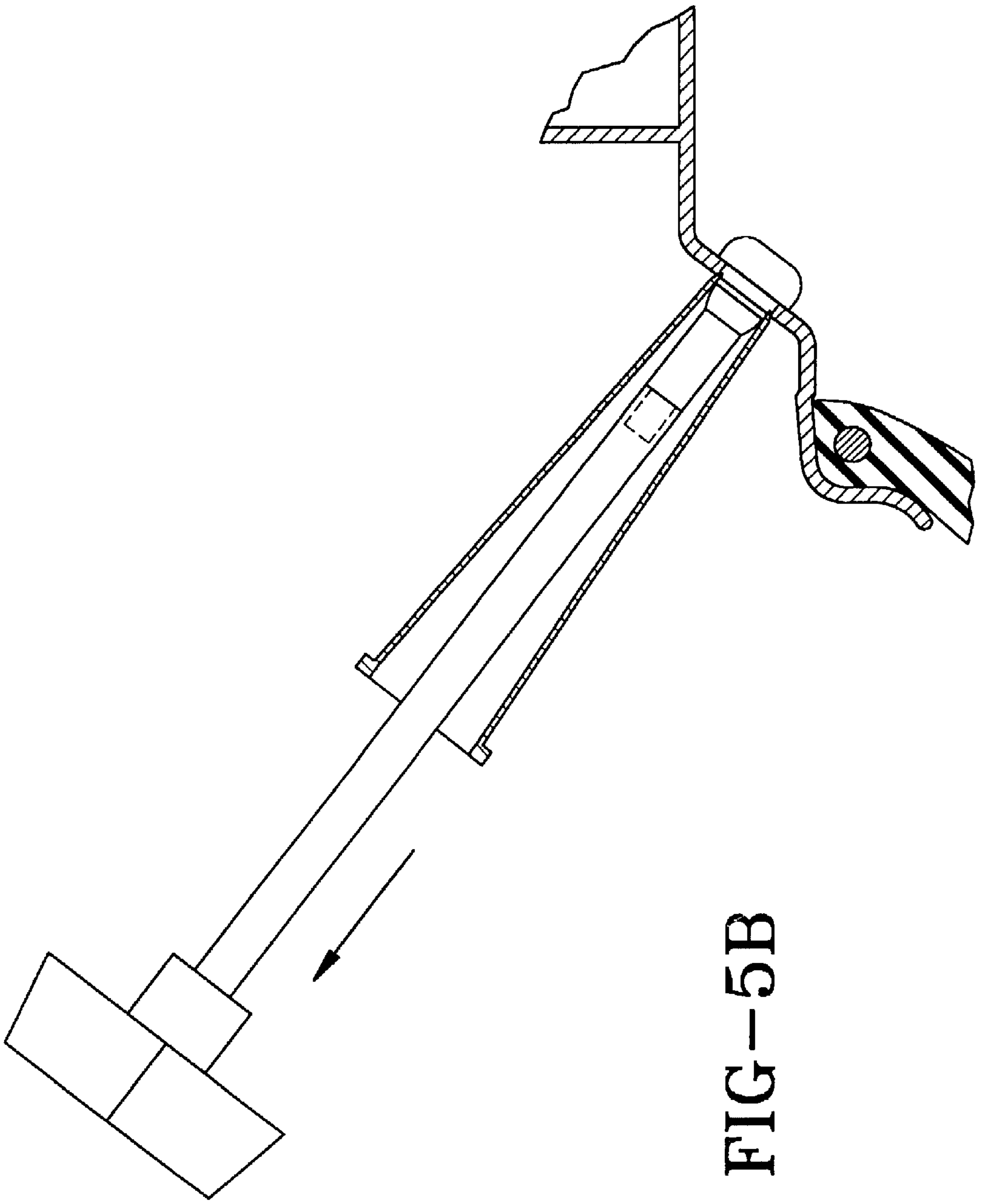

The lubricated tire stem is then inserted into sleeve 3 which guides the valve stem, and the tapered inside 20 of the sleeve compresses the bulbous end 10 of the valve stem 8 so that it may be inserted through opening 12. This is best seen in FIG. 5A where the valve stem 8 has been inserted through the opening 12 to the interior of the tire 9.

To complete the operation, the tool is withdrawn through the opening 12 until the bulbous end 10 of the valve stem seats in opening 12 in tire 9.

The materials of construction of the components of the kit are not critical. They can be made of plastic or metal, and need only be of sufficient strength to perform the necessary functions. It may be desirable to make the valve stem removal tool 1 having a shaft material 5 of metal with handle 4 being of plastic composition. Valve insertion tool 2 might be made having a metal shaft and a plastic handle. Insertion sleeve 3 might be made of a hard plastic which has a polished interface 20 to facilitate the compression and insertion of the bulbous end 10 of valve stem 8 through opening 12.

While the invention has been described with reference to the specifically illustrated and preferred modes of practice, it is not intended that the invention be unduly limited thereby. Instead, it is intended that the invention be defined by the means and their obvious equivalents set forth in the following claims.

What I claim is:

1. A valve stem removal and insertion kit comprising the following:

a. a valve stem insertion tool comprising a rod having a T-shaped handle at one end and bearing at its opposite end means for removably attaching the threaded tube of a valve stem;

b. a valve stem insertion sleeve for receiving said rod in a reciprocal relationship thereto, having at one of its ends an internal cross-section conforming to the shape and at least equal to the cross-sectional area of the unconfined bulbous end of the valve stem, at its opposite end an external cross-section conforming to the shape and slightly lesser than the area of the hole in the rim of the wheel, smoothly tapered interior wall extending between the ends thereof and terminating in an internal cross-section which is less than the cross-section of the hole in the rim of the wheel to facilitate compression and insertion of the bulbous end of a valve stem into the hole of the rim; and c. a valve stem removal tool comprising a rod having a T-shaped handle at one end and bearing at its opposite end a "J"-shaped curve, and the short side of the "J" comprising a blunt end of sufficient length and spaced apart from the rod such as to facilitate insertion into the interior opening of the bulbous end of a tire valve stem, and having sufficient curvature so as to facilitate insertion of the blunt end of the valve removal tool into the opening at the bulbous end of the tire valve and engage the opening in the valve stem which is in the interior of the wheel and thereby facilitates the removal of a valve stem from a wall of a tire.

2. A valve stem removal and insertion kit according to claim 1, wherein the rod of said valve stem removal tool is selected from the group consisting of metal and plastic.

3. A valve stem removal and insertion kit according to claim 1, wherein the short side of the "J" said valve stem removal tool is about 0.5 to 2.0 centimeters long and is spaced from said rod about 0.5 to 1.5 centimeters.

4. A valve stem removal and insertion kit according to claim 1, wherein the short side of the "J" said valve stem removal tool is about 1 centimeter long and is spaced from said rod about 1 centimeter.

5. A valve stem removal and insertion kit according to claim 1, wherein the means for removably attaching the threaded tube of a valve stem comprises threads on an interior surface of the rod which treads will removably engage the threaded tube of the vale stem to facilitate insertion of the valve stem.

6. A valve stem removal and insertion kit according to claim 1, wherein the sleeve comprises a material selected from the group consisting of metal and plastic.

* * * * *